United States Patent
Kawai et al.

(10) Patent No.: US 10,775,061 B2
(45) Date of Patent: Sep. 15, 2020

(54) AIR-CONDITIONING APPARATUS

(71) Applicant: Mitsubishi Electric Corporation, Tokyo (JP)

(72) Inventors: Kazuhiko Kawai, Tokyo (JP); Hiromitsu Kikuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/072,246

(22) PCT Filed: Apr. 5, 2016

(86) PCT No.: PCT/JP2016/061092
§ 371 (c)(1),
(2) Date: Jul. 24, 2018

(87) PCT Pub. No.: WO2017/175300
PCT Pub. Date: Oct. 12, 2017

(65) Prior Publication Data
US 2019/0032941 A1    Jan. 31, 2019

(51) Int. Cl.
*F24F 11/36* (2018.01)
*F24F 11/77* (2018.01)
(Continued)

(52) U.S. Cl.
CPC .............. *F24F 11/36* (2018.01); *F24F 11/74* (2018.01); *F24F 11/76* (2018.01); *F24F 11/77* (2018.01); *F24F 2110/65* (2018.01)

(58) Field of Classification Search
CPC .. F24F 11/36; F24F 11/74; F24F 11/76; F24F 11/77; F24F 2110/65; F25B 2500/22; F25B 2500/222
See application file for complete search history.

(56) References Cited

U.S. PATENT DOCUMENTS

2016/0091241 A1    3/2016  Suzuki et al.
2017/0198936 A1*   7/2017  Yamaguchi .............. F24F 11/74
(Continued)

FOREIGN PATENT DOCUMENTS

EP    3 150 943 A1    4/2017
EP    3 214 391 A1    9/2017
(Continued)

OTHER PUBLICATIONS

Office Action dated May 14, 2019 issued in corresponding JP patent application No. 2018-510146 (and English tanslation).
(Continued)

*Primary Examiner* — Marc E Norman
(74) *Attorney, Agent, or Firm* — Posz Law Group, PLC

(57) ABSTRACT

An air-conditioning apparatus includes a refrigerant circuit, an indoor unit, an indoor air-sending device, a refrigerant detection device which detects refrigerant in an air-conditioning target space, and a controller which sets each of a normal control mode and a rarefying control mode. In the normal control mode, an operation is performed in an operation mode set according to an air-conditioning load, and in the rarefying control mode, the indoor air-sending device is controlled at a rarefying rotation speed which is a higher rotation speed than that in the normal control mode. The controller includes a refrigerant determination unit which determines, based on the result of detection by the refrigerant detection device, whether leakage of refrigerant occurs or not, a control mode determining unit which determines, in the case where the leakage determination unit determines that leakage of refrigerant occurs, the rarefying control mode as a control mode to be set, and an operation control unit which controls the indoor air-sending device in accordance with the control mode set by the control mode setting unit.

2 Claims, 4 Drawing Sheets

(51) Int. Cl.
  *F24F 11/74*    (2018.01)
  *F24F 11/76*    (2018.01)
  *F24F 110/65*   (2018.01)

(56) References Cited

U.S. PATENT DOCUMENTS

2017/0370605 A1* 12/2017 Makino .................... F24F 11/89
2018/0283725 A1* 10/2018 Ikawa ...................... F24F 3/14

FOREIGN PATENT DOCUMENTS

| EP | 3 318 823 A1   | 5/2018  |
| JP | 5818849 B2     | 11/2015 |
| WO | 2015/194596 A1 | 12/2015 |

OTHER PUBLICATIONS

International Search Report of the International Searching Authority dated Jul. 5, 2016 for the corresponding International application No. PCT/JP2016/061092 (and English translation).
Extended European Search Report dated Feb. 28, 2019 issued in corresponding EP patent application No. 16897859.1.

* cited by examiner

AIR-CONDITIONING APPARATUS

CROSS REFERENCE TO RELATED APPLICATION

This application is a U.S. national stage application of International Application No. PCT/JP2016/061092, filed on Apr. 5, 2016, the contents of which are incorporated herein by reference.

TECHNICAL FIELD

The present invention relates to an air-conditioning apparatus using refrigerant having flammability.

BACKGROUND

Conventionally, as refrigerant to be applied in a refrigeration cycle of an air-conditioning apparatus, an HFC refrigerant such as R410A, which is nonflammable and has a low ozone-layer depletion potential, has been used. However, R410A has a property of a high global warming potential (hereinafter referred to as GWP). Therefore, in recent years, in terms of prevention of global warming, it has been discussed whether the refrigerant to be applied should be changed to refrigerant having a low GWP.

In contrast, a slightly flammable HFC refrigerant such as an R32 refrigerant is present, which has a low ozone-layer depletion potential like R410A and has a GWP that is about one third of R410A. Furthermore, a highly flammable HC refrigerant such as R290 (propane), which is a natural refrigerant having a GWP that is about one seven-hundredth of R410A, has also been used. As is often the case, refrigerants having a low GWP are flammable, although they are different from each other in the degree of flammability.

In an air-conditioning apparatus using flammable refrigerant, in the case where an indoor air-sending device is in its stopped state when refrigerant leaks into an indoor space, a flammable concentration region may be generated. In general, such refrigerant is heavier than air, and the refrigerant which has leaked stays near an indoor floor. In view of this point, an air-conditioning apparatus has been proposed in which even when it is in its stopped state, if leakage of refrigerant is detected, the indoor air-sending device is operated to rarefy the refrigerant that has leaked, with indoor airflow (for example, Patent Literature 1).

PATENT LITERATURE

Patent Literature 1: Japanese Patent No. 5818849

In the apparatus disclosed in Patent Literature 1, if the amount of leakage of refrigerant per unit time is large, there is a case where the refrigerant that has leaked cannot be diffused. Also, there is a case where an amount of flowing air which can sufficiently rarefy the refrigerant that has leaked cannot be obtained because of an obstacle present near an indoor unit or the shape of a room. In general, the maximum air-sending amount determined for air conditioning in a normal operation is not very large. The quantity of air to be supplied from an indoor air-sending device and the capacity of a motor for driving the air-sending device are determined according to an internal static pressure and an external static pressure that are set in advance and a necessary quantity of air which is required for the capacity of the air-conditioning apparatus, and a quantity of air larger than the maximum quantity of air determined for a normal operation cannot be supplied.

SUMMARY

The present invention has been made to solve the above problems, and an object of the present invention is to provide an air-conditioning apparatus which detects refrigerant that has leaked and obtains a sufficient quantity of air for rarefying the refrigerant having leaked.

An air-conditioning apparatus according to an embodiment of the present invention includes a refrigerant circuit in which a compressor, a heat-source-side heat exchanger, an expansion unit and a use-side heat exchanger are connected by a refrigerant pipe, the refrigerant circuit being provided to cause refrigerant to circulate therein; an indoor unit installed in an air-conditioning target space, and including the use-side heat exchanger; an indoor air-sending device which sends air to the use-side heat exchanger; a refrigerant detection device which is provided in the indoor unit, and detects refrigerant in the air-conditioning target space; and a controller which sets each of a normal control mode and a rarefying control mode, the normal control mode being a control mode in which the refrigerant circuit and the indoor air-sending device are controlled in accordance with an air-conditioning load, the rarefying control mode being a control mode in which the indoor air-sending device is operated at a rarefying rotation speed which is a higher rotation speed than that in the normal control mode. The controller includes a leakage determination unit which determines, based on the result of detection by the refrigerant detection device, whether leakage of refrigerant occurs or not, a control mode determining unit which determines, in the case where the leakage determination unit determines that leakage of refrigerant occurs, the rarefying control mode as a control mode to be set, and an operation control unit which controls the indoor air-sending device in accordance with the control mode determining by the control mode determining unit.

In an air-conditioning apparatus according to the present invention, in the case where it is determined that refrigerant leaks, an indoor air-sending device is caused to operate at a higher rotation speed than that in a normal operation, thereby obtaining a quantity of air for rarefying the leakage refrigerant, and preventing formation of a flammable concentration region.

DETAILED DESCRIPTION

Embodiment 1

Figure 1:
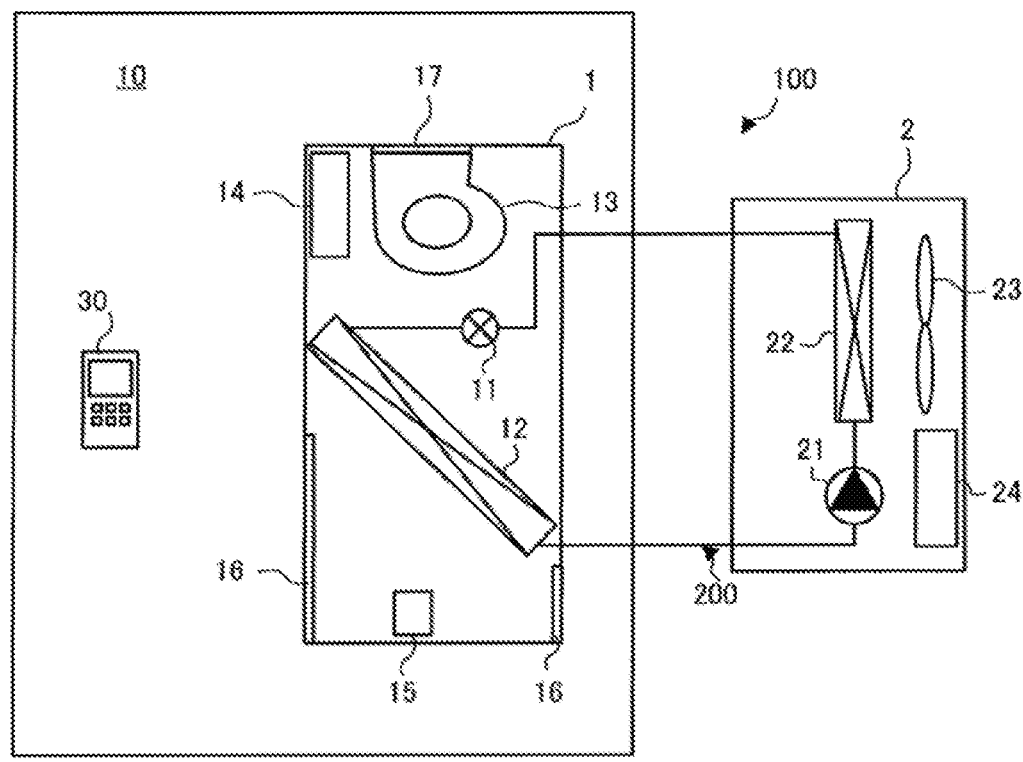
FIG. 1 is a configuration diagram of an air-conditioning apparatus according to embodiment 1.

FIG. 1 is a configuration diagram of an air-conditioning apparatus according to embodiment 1. As illustrated in FIG. 1, an air-conditioning apparatus 100 according to embodiment 1 includes an indoor unit 1 and an outdoor unit 2. The indoor unit 1 and the outdoor unit 2 are connected to each other by a refrigerant pipe, and form a refrigerant circuit 200.

In the indoor unit 1, an expansion unit 11 and a use-side heat exchanger 12 that are connected in series are mounted. The expansion unit 11 is, for example, an electronic expansion valve whose opening degree is variably controlled, and decompresses and expanses refrigerant. During a cooling operation, the use-side heat exchanger 12 functions as an evaporator to evaporate and gasify refrigerant. During a heating operation, the use-side heat exchanger 12 functions as a condenser to condense and liquify refrigerant. Furthermore, in the indoor unit 1, an indoor air-sending device 13 is installed to send air to the use-side heat exchanger 12. The indoor air-sending device 13 is a centrifugal fan, a multiblade fan or another type of fan, the rotation speed of which is varied by, for example, an inverter, to thereby control the quantity of air.

Also, in the indoor unit 1, an indoor control device 14 is provided. The indoor control device 14 is an arithmetic device including a general-purpose CPU, a data bus, an input/output port, a nonvolatile memory, a timer, etc. The indoor control device 14 controls setting of the opening degree of the expansion unit 11, the rotation speed of the indoor air-sending device 13, etc., in accordance with operation information including an indoor air temperature, set temperature, temperature of a refrigerant pipe, etc. The air-conditioning apparatus 100 includes an operation unit 30 such as a remote control. An operation instruction and setting information input via the operation unit 30 are transmitted to the indoor control device 14, and are reflected in the operation.

Furthermore, in the indoor unit 1, a refrigerant detection device 15 is installed. The refrigerant detection device 15 is, for example, a temperature sensor or a concentration sensor or the like, which detects refrigerant in an air-conditioning target space 10. The refrigerant detection device 15 monitors presence of refrigerant at all times. To be more specific, when refrigerant leaks from a refrigerant pipe to the outside thereof, the refrigerant detection device 15 can extract, for example, a variation in the temperature of ambient air or a variation in a gas concentration as a measurement value or as a variation of the measurement value. A result of detection by the refrigerant detection device 15 is transmitted to the indoor control device 14.

It suffices that a sensor to be applied as the refrigerant detection device 15 is selected in accordance with the type of refrigerant, a location where it is installed and an area to be subjected to detection. For example, an infrared sensor, a temperature sensor, a heat semiconductor sensor that contacts and detects refrigerant, etc., are present as refrigerant leakage detectors.

In contrast, in the outdoor unit 2, a compressor 21 and a heat-source-side heat exchanger 22 that are connected in series are mounted. The compressor 21 sucks refrigerant, and compresses the refrigerant to cause it to be in a high-temperature, high-pressure state. For example, the compressor 21 is a given type of compressor the rotation speed of which is controlled by an inverter 25 and the capacity of which is thus controlled. During a cooling operation, the heat-source-side heat exchanger 22 functions as a condenser. During a heating operation, the heat-source-side heat exchanger 22 functions as an evaporator. An outdoor air-sending device 23 is provided for the heat-source-side heat exchanger 22, and supplies outside air to the heat-source-side heat exchanger 22. The outdoor air-sending device 23 is, for example, a centrifugal fan, a multiblade fan, or another type of fan.

Also, in the outdoor unit 2, an outdoor control device 24 is provided. The outdoor control device 24 is an arithmetic device including a general-purpose CPU, a data bus, an input/output port, a nonvolatile memory, a timer, etc. The indoor control device 14 and the outdoor control device 24 are connected to each other by a transmission line, and can thus transmit and receive information to and from each other. The outdoor control device 24 performs control determined in advance with respect to the rotation speed of the compressor 21, the rotation speed of the outdoor air-sending device 23, etc., in response to an operation instruction and operation information transmitted from the indoor unit 1.

In embodiment 1, the compressor 21 is mounted in the outdoor unit 2; however, the compressor 21 may be mounted in the indoor unit 1. In this case, the compressor 21 may be configured such that the rotation speed of the compressor 21 is controlled by the indoor control device 14. A main operation control in the air-conditioning apparatus 100 is performed by the indoor control device 14 and the outdoor control device 24. The CPU of the outdoor control device 24 performs entry of each of operation modes such as cooling and heating modes, which is set using the operation unit 30. Specifically, the CPU of the outdoor control device 24 controls the refrigerant circuit 200, the outdoor air-sending device 23, etc., in accordance with the operation load of the use-side heat exchanger 12.

As described above, the refrigerant circuit 200 is configured as a refrigeration cycle system in which the compressor 21, the heat-source-side heat exchanger 22, the expansion unit 1, and the use-side heat exchanger 12 are successively connected annularly via a refrigerant pipe. As the refrigerant, any of an HFC refrigerant, an HC refrigerant and the like may be applied. The following description is given on the presumption that by way of example, refrigerant having flammability is applied.

A cooling operation to be performed by the air-conditioning apparatus 100 will be described. The indoor unit 1 is installed in the air-conditioning target space 10, and refrigerant is shut into the refrigerant circuit 200 of the air-conditioning apparatus 100. In the refrigerant circuit 200, the refrigerant is caused to be in a high temperature and high pressure state by the compressor 21, is discharged from the compressor 21, and flows into the heat-source-side heat exchanger 22. In the heat-source-side heat exchanger 22, the refrigerant is subjected to heat exchange with air supplied from the outdoor air-sending device 23, and condenses and liquifies. That is, the refrigerant transfers heat, and its state changes into a liquid state. The condensed and liquified refrigerant flows through the refrigerant pipe and flows into the expansion unit 11.

In the expansion unit 11, the refrigerant is decompressed and expanded, and its state changes to a low-temperature, low-pressure and two-phase gas-liquid state. After changing into such a two-phase gas-liquid refrigerant, it flows into the use-side heat exchanger 12. In the use-side heat exchanger 12, the two-phase gas-liquid refrigerant is subjected to heat exchange with indoor air supplied from the indoor air-sending device 13, and gasifies. That is, the two-phase gas-liquid refrigerant receives heat from air to cool the air, and its status changes to a gas state. The gasified refrigerant flows out of the use-side heat exchanger 12, passes through the refrigerant pipe, and is re-sucked by the compressor 21.

Air in the air-conditioning target space 10, which is to be supplied to the use-side heat exchanger 12, passes through an air inlet 16 provided in lower part of the indoor unit 1, and is sucked into the indoor unit 1. The sucked air is cooled by evaporation heat of the refrigerant that has flowed into the use-side heat exchanger 12, and is supplied to the air-conditioning target space 10 by the indoor air-sending device 13 through an air outlet 17 provided in upper part of the indoor unit 1. Indoor air cools a cooling target region, a heat generator, etc., which are installed therein, and as a result its temperature rises. The indoor air whose temperature has risen is re-supplied to the use-side heat exchanger 12 by the air-sending device, and is cooled by evaporation heat of the refrigerant. In such a manner, the air subjected to heat exchange is supplied to the air-conditioning target space 10, and is circulated therein, thereby air-conditioning the air-conditioning target space 10. It should be noted that FIG. 1 illustrates the case where two air inlets 16 are provided; however, only one of the air inlets 16 may be provided or a plurality of air inlets 16 may be provided.

Figure 2:
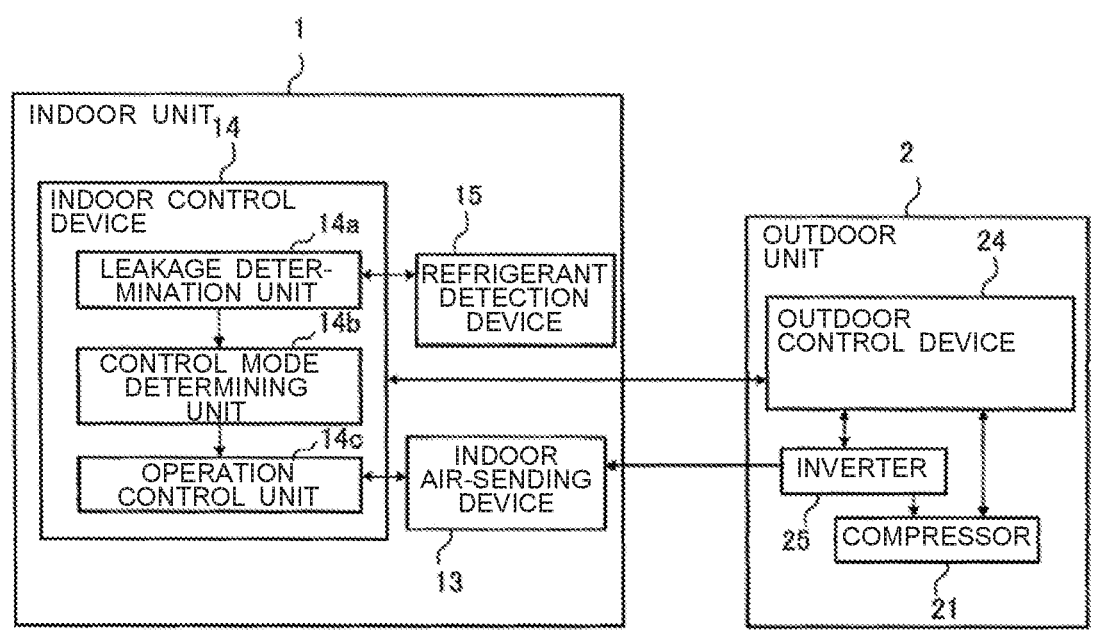
FIG. 2 is a functional block diagram of the air-conditioning apparatus according to embodiment 1.

A function of the indoor control device 14 will be described with reference to FIG. 2. FIG. 2 is a functional block diagram of the air-conditioning apparatus according to embodiment 1. The indoor control device 14 includes a leakage determination unit 14a, a control mode determining unit 14b and an operation control unit 14c.

The leakage determination unit 14a determines, based on a result of detection by the refrigerant detection device 15, whether leakage of refrigerant occurs or not. The result of this determination is added to operation information. It suffices that how to determine whether leakage of refrigerant occurs is appropriately determined in accordance with the type of a sensor to be applied as the refrigerant detection device 15. For example, in the case where a temperature sensor is used as the refrigerant detection device 15, when a temperature variation which corresponds to the result of detection is greater than a set variation, the leakage determination unit 14a determines that leakage of refrigerant occurs. The leakage determination unit 14a may make determination based on an increase rate, instead of the variation. In the case where a concentration sensor is adopted as the refrigerant detection device 15, it may determine that leakage of refrigerant occurs, for example, when a measurement value is greater than a set value.

Referring to FIG. 1, the refrigerant detection device 15 is installed in the indoor unit 1. However, the refrigerant detection device 15 may be installed outside the indoor unit 1, that is, in the air-conditioning target space 10. In this case, the refrigerant detection device 15 and the indoor control device 14 may be connected by a transmission line or the like. Also, it may be set that the refrigerant detection device 15 is not directly connected to the indoor control device 14. For example, the refrigerant detection device 15 may be connected to the indoor control device 14, with the operation unit 30 interposed between them, the operation unit 30 being capable of communicating with the indoor control device 14. Furthermore, the refrigerant detection device 15 may be configured such that a threshold is set in advance in the refrigerant detection device 15, and the refrigerant detection device 15 transmits a contact signal to the indoor control device 14 when an obtained measurement value is equal to or greater than the threshold. The method of detecting leakage of refrigerant and the way of transmitting information to the indoor control device 14 are not limited to the above.

The control mode determining unit 14b determines a control mode in accordance with a result of determination by the leakage determination unit 14a. As control modes, two control modes, i.e., a normal control mode and a rarefying control mode, are present. Control information associated with each of the control modes is stored in the indoor control device 14. In the case where the air-conditioning apparatus 100 operates in the normal control mode, control over the indoor air-sending device 13 is performed in accordance with the set operation mode. In contrast, in the rarefying control mode, the indoor air-sending device 13 is caused to operate at a rarefying rotation speed which is a higher rotation speed than that in the normal control mode. Normally, the air-conditioning apparatus 100 is controlled in the normal control mode. In the case where the leakage determination unit 14a determines that leakage of refrigerant occurs, the control mode determining unit 14b determines the rarefying control mode as the control mode to be set.

The operation control unit 14c performs operation control in accordance with a control mode determined by the control mode determining unit 14b. In the case where the normal control mode is determined, the operation control unit 14c performs control in accordance with control information determined in advance for the normal control mode. The operation control unit 14c may be configured to refer to an operation state of each apparatus, a set operation mode, operation information, etc. In the case where the rarefying control mode is set, for example, the operation control unit 14c controls the rotation speed of the indoor air-sending device 13 to reach a rarefying rotation speed which is 120% of the maximum rotation speed at the time of performing a normal operation. Furthermore, in the case where the control mode determining unit 14b determines the normal control mode as the control mode to be set, the operation control unit 14c changes the control to be performed, to the control according to the normal control mode. Specifically, the operation control unit 14c changes the rotation speed of the indoor air-sending device 13 back to the rotation speed for the normal operation. Furthermore, the operation control unit 14c notifies the outdoor control device 24 that the control mode has been changed to the normal control mode. Upon reception of this notification, the outdoor control device 24 can resume control over the refrigerant circuit 200, the outdoor air-sending device 23, etc. in accordance with the set operation mode.

The indoor air-sending device 13 includes a fan and a motor. The rotation speed of the motor is frequency-controlled by the inverter 25. Therefore, the quantity of air from the indoor air-sending device 13 is variable.

It should be noted that with respect to embodiment 1, although it is explained above that the indoor control device 14 includes all the leakage determination unit 14a, the control mode determining unit 14b and the operation control unit 14c, the configuration in which these elements should be provided is not limited to such a configuration as described above. For example, the operation control unit 14c may be included in the outdoor control device 24. The indoor control device 14 and the outdoor control device 24 are connected to each other such that they can communicate with each other. Therefore, the indoor control device 14 and the outdoor control device 24 can transmit and receive information to and from each other regardless of which of the indoor control device 14 and the outdoor control device 24 has each of functions.

Figure 3:
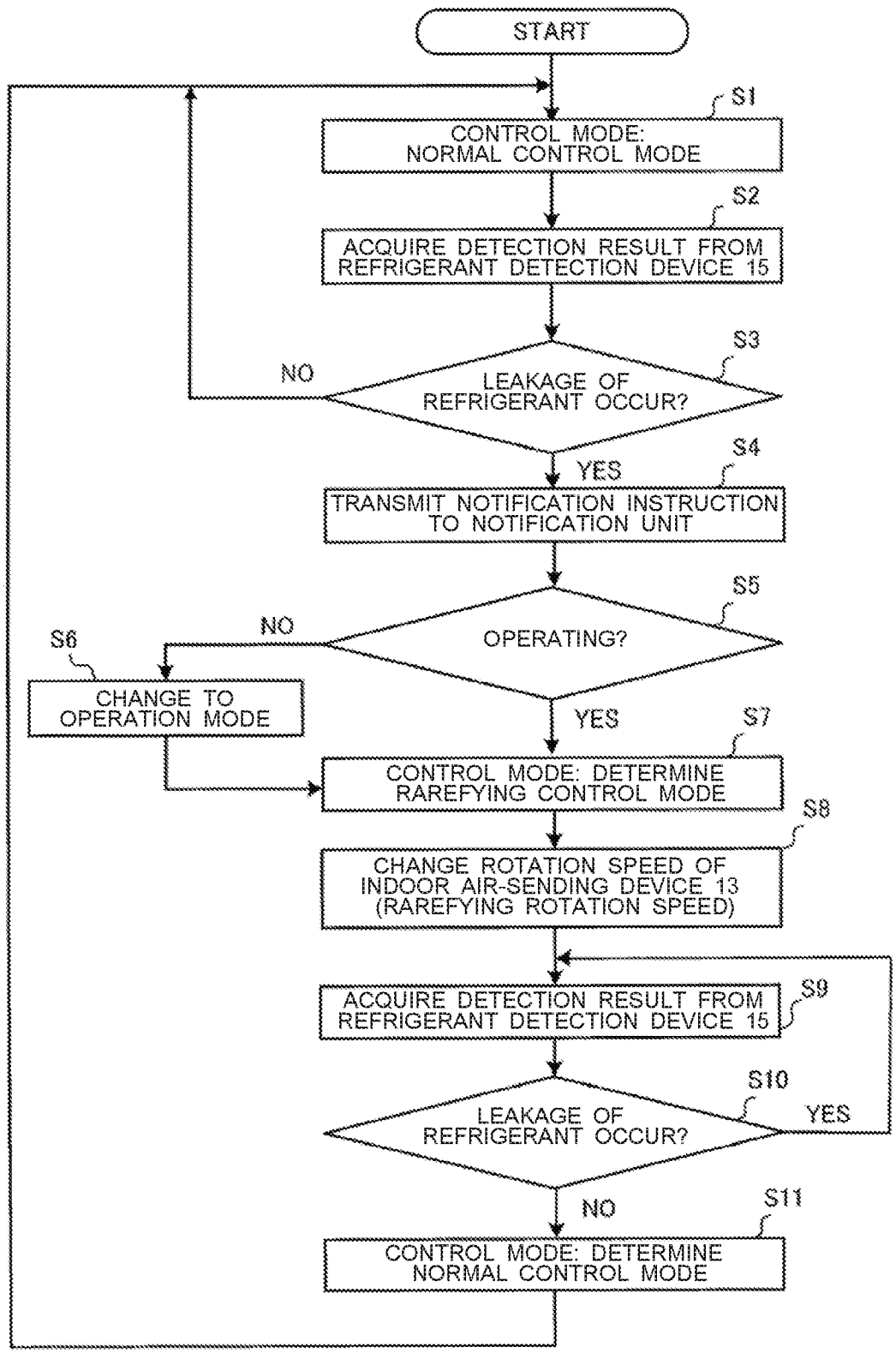
FIG. 3 is a flowchart illustrating a leakage control of in the air-conditioning apparatus according to embodiment 1.

FIG. 3 is a flowchart illustrating leakage control in the air-conditioning apparatus according to embodiment 1. It will be described how the indoor control device 14 monitors leakage of refrigerant and what processing is executed in the case where leakage of refrigerant occurs with reference to FIG. 3.

Normally, in the control mode determining unit 14b, the normal control mode is determined as the operation mode to be set, and in the operation control unit 14c, the normal control mode is entered (step S1). The leakage determination unit 14a acquires a result of detection from the refrigerant detection device 15 (step S2), and determines, based on the result of detection, whether leakage of refrigerant occurs or not (step S3). In the case where the refrigerant detection device 15 is a temperature sensor, the result of detection is, for example, temperature information. In step 3, in the case where the variation between the temperature detected the last time and the temperature detected at the present time is smaller than a threshold set in advance, it is determined that leakage of refrigerant does not occur. In this case, the indoor control device 14 returns the control to step S1, and repeats the processing from step S1. In contrast, in the case where the variation between the above detected temperatures is equal to or greater than the threshold, and it is determined in step S3 that leakage of refrigerant occurs, the indoor control device 14 transmits a notification instruction to a notification unit (step S4).

Next, the indoor control device 14 confirms the present operation state (step S5). In the case where the indoor unit 1 is operating in the normal control mode, the control mode determining unit 14b changes the control mode from the normal control mode to the rarefying control mode (step S7). In contrast, in the case where the indoor unit 1 is in a stopped state, the operation control unit 14c temporarily changes the control mode to the normal control mode (step S6), and then, the control mode determining unit 14b determines the rarefying control mode as the control mode to be set (step S7). That is, in the case where the indoor unit 1 is in the stopped state, the control mode determining unit 14b does not change the control mode until the refrigerant circuit 200 starts to operate; that is, the control mode determining unit 14b changes the control mode from the normal control mode to the rarefying control mode after the refrigerant circuit 200 starts to operate. It should be noted that steps S5 and S6 may be omitted, and fixed control not depending on the operation state may be performed.

In step S7, when the rarefying control mode is determined as the next control mode, the operation control unit 14c performs operation control according to the set rarefying control mode (step S8). That is, the operation control unit 14c causes the indoor air-sending device 13 to operate at a rarefying rotation speed that is a higher rotation speed than the rotation speed for the normal control mode. In the case where the quantity of air from the indoor air-sending device 13 is frequency-controlled by the inverter 25, the operation control unit 14c varies the frequency of the inverter 25 to cause the quantity of air from the indoor air-sending device 13 to be larger than the quantity of air for the normal control mode.

After control according to the rarefying control mode starts, the leakage determination unit 14a re-acquires a result of detection from the refrigerant detection device 15 (step S9), and determines whether leakage of refrigerant occurs or not (step S10). In the case where it is determined in step S10 that leakage of refrigerant occurs, the control in the rarefying control mode is continued, and leakage monitoring processes of step S9 to step S10 are repeated. In contrast, in the case where it is determined in step S10 that leakage of refrigerant does not occur, the control mode determining unit 14b determines that the leakage refrigerant has been sufficiently diffused, and determines the normal control mode as the next control mode (step S11). The operation control unit 14c performs an operation in the normal control mode in accordance with the changed control mode (step S1). That is, the operation control unit 14c causes the indoor air-sending device 13 to operate at the rotation speed for the normal control mode again. In the case where the operation mode is set, control according to the operation mode is resumed.

It should be noted that the above explanation referring to FIG. 3 is given with respect to the case where in the rarefying control mode, the rotation speed of the indoor air-sending device 13 is changed to the rarefying rotation speed; however, in the rarefying control mode, in addition to the above change, the operation of the compressor 21 may be also stopped. That is, in the case where it is confirmed as the operation state in step S5 that for example, the cooling operation or the heating operation is being performed, and where the compressor 21 is operating, the operation control unit 14c carries out step S8, and stops the compressor 21.

Furthermore, the rarefying control mode is not ended by a normal operation-stop operation using the operation unit 30 such as a remote control. That is, in the rarefying control mode, automatic control is prioritized. Therefore, it is possible to prevent an emergency operation from being stopped along with the normal operation in the case where leakage of refrigerant occurs. In the rarefying control mode, the indoor air-sending device 13 operates at all times. The rarefying control mode is ended only by a specific setting change which is made by the operation unit 30 or a switch on a control board of the indoor control device 14 or the like.

In the case where it is determined in step S3 that leakage of refrigerant occurs, in step S4, a notification instruction is issued to the notification unit. The notification unit may use, for example, at least one of sound and light to notify a user of the air-conditioning apparatus 100 of danger. Thereby, the user can know leakage of refrigerant, and take measures, etc., for ensuring safety.

Furthermore, in order that leakage control be performed at all times, the air-conditioning apparatus 100 may be configured such that it can be driven by power supplied from an uninterruptible power supply (UPS) or a built-in battery. With provision of such an alternative power supply, leakage monitoring and rarefying control can be performed even during a power outage. It is therefore possible to prevent occurrence of an accident which would be caused by leakage of refrigerant, and ensure safety of the air-conditioning apparatus 100. Furthermore, in the case where the indoor unit 1 is installed near a floor, and in particular, refrigerant heavier than air leaks, it tends to stay near the floor. Therefore, a rarefying effect in the rarefying control mode can be easily obtained.

As described above, in embodiment 1, the air-conditioning apparatus 100 includes: the refrigerant detection device 15 which detects refrigerant in the air-conditioning target space 10; and a controller which performs entry of each of the normal control mode and the rarefying control mode, the normal control mode being a control mode in which the refrigerant circuit 200 and the indoor air-sending device 13 are controlled in accordance with an air conditioning load, the rarefying control mode being a control mode in which the indoor air-sending device 13 is caused to operate at a rarefying rotation speed that is a higher rotation speed than the rotation speed in the normal control mode. The controller includes: the leakage determination unit 14a which determines, based on a result of detection by the refrigerant detection device 15, whether leakage of refrigerant occurs or not; the control mode determining unit 14b which determines, in the case where the leakage determination unit 14a determines that leakage of refrigerant occurs, the rarefying control mode as the control mode to be set; and the operation control unit 14c which controls the indoor air-sending device 13 in accordance with the control mode determined by the control mode determining unit 14b.

By virtue of the above, in the case where it is determined that leakage of refrigerant occurs, the air-conditioning apparatus 100 can obtain a quantity of rarefying air which is a larger air quantity than a normal quantity of air, and can also prevent provision of a region where the concentration of refrigerant is high. It is therefore possible to ensure safety of the air-conditioning apparatus 100.

Furthermore, in the rarefying control mode, the operation control unit 14c may control the indoor air-sending device 13 to operate at the rarefying rotation speed, and stop the operation of the compressor 21.

By virtue of the above, in the case where it is determined that leakage of refrigerant occurs, the compressor 21 is automatically controlled to be stopped. It is therefore possible to restrict the spread of the leakage of the refrigerant.

In the case where while the operation is stopped, the leakage determination unit 14a determines that leakage of refrigerant occurs, the control mode determining unit 14b may determine the rarefying control mode as the control mode to be set. Thereby, fixed control can be performed regardless of the operation state, and management for leakage of refrigerant is easily carried out.

In the case where while the operation is stopped, the leakage determination unit 14a determines that leakage of refrigerant occurs, the control mode determining unit 14b may determine the rarefying control mode as the control mode to be set, after the operation control unit 14c changes the control mode to the normal control mode. Thereby, it is possible to prevent a sudden change from the stopped state of the operation to the rarefying control mode, thus reducing the load on each of components of the apparatus.

In the case where the refrigerant detection device 15 is a temperature sensor, the leakage determination unit 14a may determine that leakage of refrigerant occurs, in the case where a temperature variation detected by the refrigerant detection device 15 is greater than a set variation. In this case, a relatively inexpensive temperature sensor can be applied. In addition, since it is determined based on the above variation whether leakage of refrigerant occurs or not, the result of the determination is stable, as compared with the case where whether leakage of refrigerant occurs or not is determined only based on a measurement value.

Furthermore, refrigerant may have combustibility. In the case of applying this refrigerant, if the refrigerant leaks, it is diffused by a larger quantity of air than that in the normal operation. Accordingly, even if the refrigerant leaks, a flammable concentration region cannot be easily provided.

In the case where while the operation is performed in the rarefying control mode, the leakage determination unit 14a determines that leakage of refrigerant does not occur, the control mode determining unit 14b may determine the normal control mode as the control mode to be set. Thereby, based on a result of determination, the control mode can be automatically changed back to the normal control mode, thus simplifying the operation by the user.

Embodiment 2

Regarding embodiment 2, the following description is given with respect to an air-conditioning apparatus 100 which has alternative measures for the case where the operation in the rarefying control mode cannot be sufficiently performed in the case where a plurality of air-conditioning apparatuses are installed in the same air-conditioning target space 10. In the description, only configurations of embodiment 2 which differ from those of embodiment 1 will be explained, and the other configurations of embodiment 2 are the same as those of embodiment 1.

Indoor control devices 14 are connected to each other by transmission lines, and transmit and receive signals to and from each other in accordance with settings. In the description, as a representative example of the configuration of a plurality of air-conditioning apparatuses, the configuration of the air-conditioning apparatus 100 and an other single air-conditioning apparatus 101 will be explained. Some or all of the above plurality of air-conditioning apparatuses may have a configuration in the same or similar manner to that of the air-conditioning apparatus 100 or the other air-conditioning apparatus 101.

Figure 4:
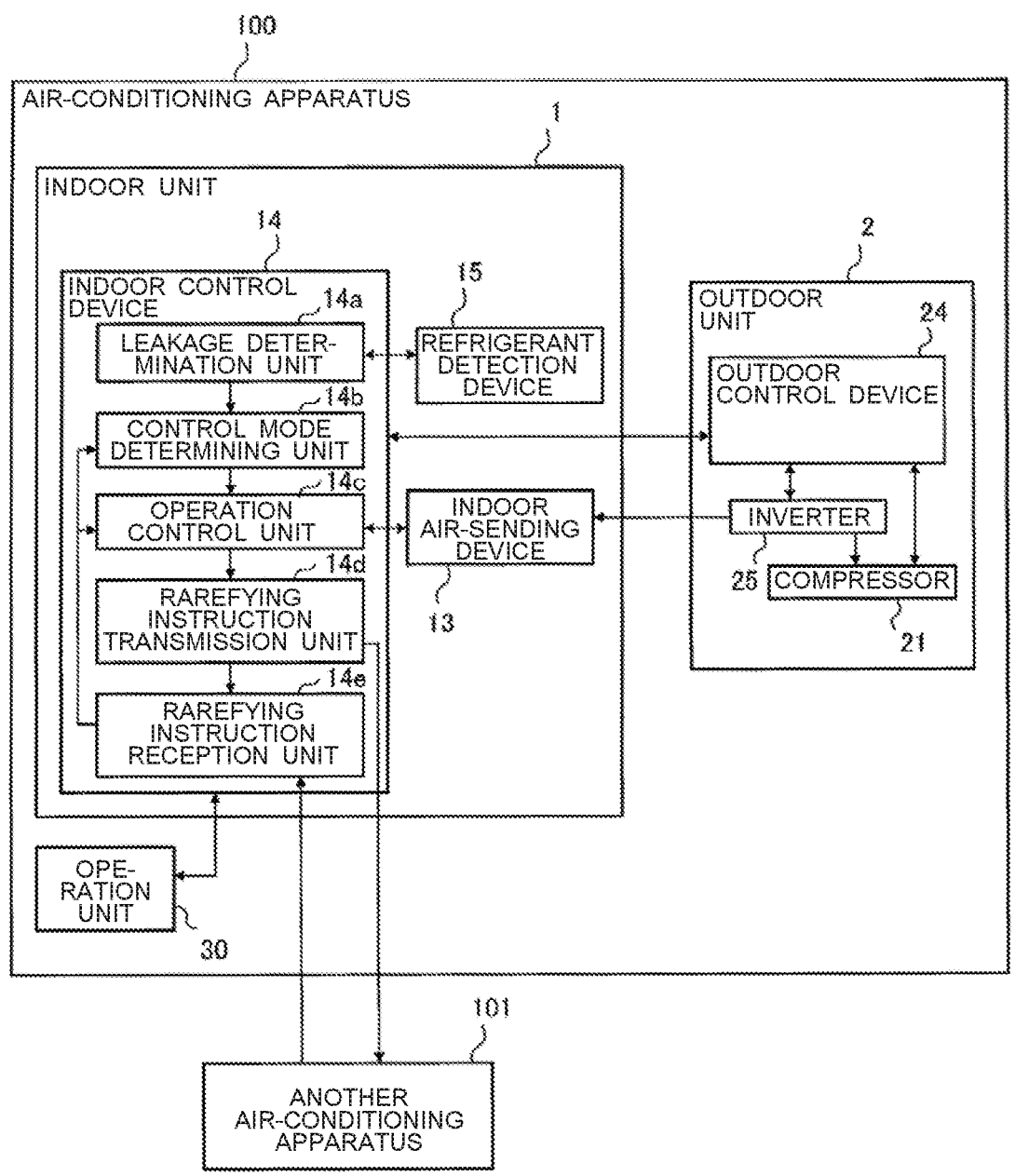
FIG. 4 is a functional block diagram of an air-conditioning apparatus according to embodiment 2.

FIG. 4 is a functional block diagram of the air-conditioning apparatus 100 according to embodiment 2. The indoor control device 14 includes the leakage determination unit 14a, the control mode determining unit 14b, the operation control unit 14c, a rarefying instruction transmission unit 14d and a rarefying instruction reception unit 14e.

The rarefying instruction transmission unit 14d transmits to the other air-conditioning apparatus 101 a rarefying operation instruction for causing the other air-conditioning apparatus 101 to operate in the rarefying control mode. In the case where the operation cannot be performed due to a failure of the indoor air-sending device 13 or the like, or a predetermined output cannot be performed, the operation control unit 14c can transmit a rarefying operation instruction to the other air-conditioning apparatus 101. Upon reception of the rarefying operation instruction, the other air-conditioning apparatus 101 enters the rarefying control mode, and performs such a predetermined operation in the rarefying control mode as described with respect to embodiment 1. Specifically, the other air-conditioning apparatus 101 causes an indoor air-sending device of the indoor unit 1 to operate at a higher rotation speed than that for a normal operation.

The rarefying instruction reception unit 14e receives from the other air-conditioning apparatus 101 a rarefying operation instruction for execution of the operation in the rarefying control mode. Upon reception of the rarefying operation instruction, the control mode determining unit 14b of the air-conditioning apparatus 100 may determine the rarefying control mode as the control mode to be set, and the air-conditioning apparatus 100 can perform the rarefying operation instead of the other air-conditioning apparatus 101.

Furthermore, the air-conditioning apparatus 100 may be configured to perform in advance setting of whether a rarefying operation instruction from the other air-conditioning apparatus 101 can be received or not, on the rarefying instruction reception unit 14e via the operation unit 30. The operation unit 30 may be a remote controller or a switch or the like which is provided in the indoor control device 14. In accordance with the setting of whether a rarefying operation instruction can be received or not, in the case where the rarefying operation instruction transmitted from the other air-conditioning apparatus 101 is received, it is determined whether or not to enter the rarefying control mode.

Figure 5:
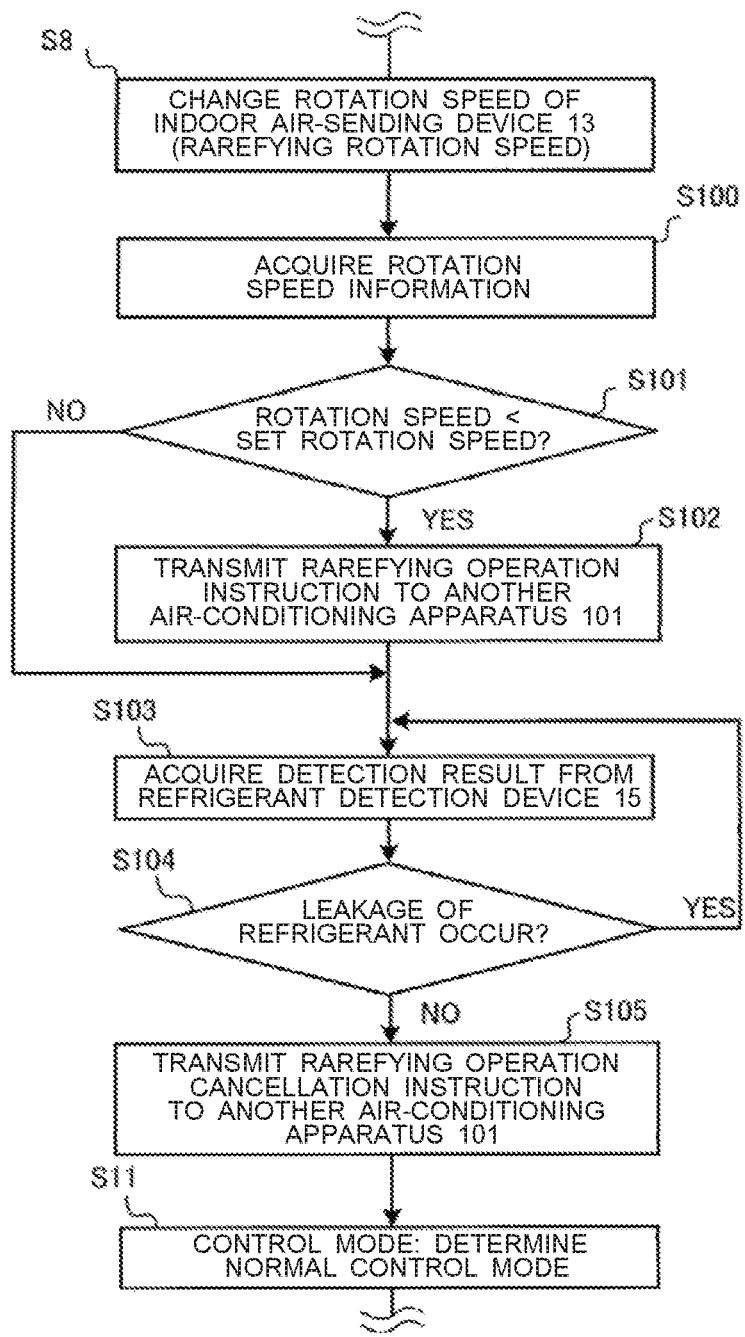
FIG. 5 is a flowchart of a rarefying operation instruction of the air-conditioning apparatus according to embodiment 2.

FIG. 5 is a flowchart of a rarefying operation instruction of the air-conditioning apparatus 100 according to embodiment 2. Step S1 to step S8 and the steps from step S11 onward are the same as those in embodiment 1 as illustrated in FIG. 3, and their explanations will thus be omitted.

In the air-conditioning apparatus 100, after the control mode determining unit 14b determines the rarefying control mode as the control mode to be set, in step S8, the rotation speed of the indoor air-sending device 13 is changed to the rarefying rotation speed. Next, the operation control unit 14c acquires rotation speed information regarding the indoor air-sending device 13 (step S100). In the case where it is determined that the rotation speed indicated by the acquired rotation speed information is lower than a set rotation speed (step S101), the operation control unit 14c causes the rarefying instruction transmission unit 14d to transmit a rarefying operation instruction to the other air-conditioning apparatus 101 (step S102). In the case where the rotation speed indicated by the acquired rotation speed information is equal to or higher than the set rotation speed (step S101), the operation control unit 14c determines that the operation in the rarefying control mode in the air-conditioning apparatus 100 is being normally performed, and does not cause a rarefying operation instruction to be transmitted to the other air-conditioning apparatus 101.

While the operation in the rarefying control mode is being performed in the air-conditioning apparatus 100 or the other air-conditioning apparatus 101, the leakage determination unit 14a acquires a result of detection from the refrigerant detection device 15 (step S103), and determines whether leakage of refrigerant occur or not (step S104). In the case where it is determined that leakage of refrigerant occurs, the step to be carried out is returned to step S9, and monitoring processes of steps S103 and S104 are repeated. In contrast, in the case where it is determined that leakage of refrigerant does not occur (step S104), the rarefying instruction transmission unit 14d transmits a rarefying operation cancellation instruction to the other air-conditioning apparatus 101 (step S105). Next, the control mode determining unit 14b of the air-conditioning apparatus 100 determines the normal control mode as the control mode to be set. In contrast, in the case where the other air-conditioning apparatus 101 that has received the rarefying operation cancellation instruction is performing the operation in the rarefying control mode, the normal control mode is determined as the control mode to be set, and the operation mode set before reception of the rarefying operation instruction is entered.

As described above, in embodiment 2, the controller of the air-conditioning apparatus 100 may include the rarefying instruction transmission unit 14d that transmits a rarefying operation instruction for causing the other air-conditioning apparatus 101 provided in the same air-conditioning target space 10 as the air-conditioning apparatus 100 to perform the operation in the rarefying control mode. The operation control unit 14c may cause the rarefying instruction transmission unit 14d to transmit a rarefying operation instruction to the other air-conditioning apparatus 101, in the case where it is determined that the rotation speed of the indoor air-sending device 13 in the rarefying control mode is lower than the set rotation speed.

Thereby, in the case where the air-conditioning apparatus 100 detects leakage of refrigerant, even if the indoor air-sending device 13 of the air-conditioning apparatus 100 is not able to operate, it is possible to rarefy the leakage refrigerant with indoor air by issuing a rarefying operation instruction to the other air-conditioning apparatus 101, and ensure safety in case of an emergency.

Furthermore, the controller may include the rarefying instruction reception unit 14e which receives a rarefying operation instruction for execution of an operation in the rarefying control mode, from the other air-conditioning apparatus 101 provided in the same air-conditioning target space 10 as the air-conditioning apparatus 100. The control mode determining unit 14b may determine the rarefying control mode as the control mode to be set, in the case where the rarefying operation instruction is received by the rarefying instruction reception unit 14e.

By virtue of the above, the air-conditioning apparatus 100 can perform the rarefying operation of the other air-conditioning apparatus 101 instead of the other air-conditioning apparatus 101, and ensure safety in the case where refrigerant leaks.

Furthermore, the operation unit 30 may be further provided, which performs in advance setting of whether the rarefying operation instruction from the other air-conditioning apparatus 101 can be received or not, on the rarefying instruction reception unit 14e. Thereby, it is possible to automatically cause the air-conditioning apparatus 100 to perform the operation in the rarefying control mode instead of the other air-conditioning apparatus 101, and avoid processing on an unnecessary signal.

The invention claimed is:

1. An air-conditioning apparatus comprising:
   a refrigerant circuit in which a compressor, a heat-source-side heat exchanger, an expansion unit and a use-side heat exchanger are connected by a refrigerant pipe, the refrigerant circuit being configured to cause refrigerant to circulate therein;
   an indoor unit installed in an air-conditioning target space, and including the use-side heat exchanger;
   an indoor air-sending device configured to send air to the use-side heat exchanger;
   a refrigerant detection device provided in the indoor unit, and configured to detect refrigerant in the air-conditioning target space; and
   a controller configured to:
   execute entry of each of a normal control mode and a rarefying control mode, the normal control mode being a control mode in which the refrigerant circuit and the indoor air-sending device are controlled in accordance with an air-conditioning load, the rarefying control mode being a control mode in which the indoor air-sending device is operated at a rarefying rotation speed which is a higher rotation speed than that in the normal control mode,
   determine, based on a result of detection by the refrigerant detection device, whether a leakage of refrigerant occurs,
   determine, in a case where the leakage of refrigerant is determined to occur, the rarefying control mode as a control mode to be set,
   control the indoor air-sending device in accordance with the control mode as previously determined by the controller, and
   while an operation of the air-conditioning apparatus is in a stopped state, in a case where the leakage of refrigerant is determined to occur, determine the rarefying control mode as the control mode to be set, after the control mode is changed to the normal control mode.

2. An air-conditioning apparatus comprising:
   a refrigerant circuit in which a compressor, a heat-source-side heat exchanger, an expansion unit and a use-side heat exchanger are connected by a refrigerant pipe, the refrigerant circuit being configured to cause refrigerant to circulate therein;
   an indoor unit installed in an air-conditioning target space, and including the use-side heat exchanger;

an indoor air-sending device configured to send air to the use-side heat exchanger;

a refrigerant detection device provided in the indoor unit, and configured to detect refrigerant in the air-conditioning target space;

a controller configured to:

execute entry of each of a normal control mode and a rarefying control mode, the normal control mode being a control mode in which the refrigerant circuit and the indoor air-sending device are controlled in accordance with an air-conditioning load, the rarefying control mode being a control mode in which the indoor air-sending device is operated at a rarefying rotation speed which is a higher rotation speed than that in the normal control mode, determine, based on a result of detection by the refrigerant detection device, whether a leakage of refrigerant occurs, determine, in a case where the leakage of refrigerant is determined to occur, the rarefying control mode as a control mode to be set, control the indoor air-sending device in accordance with the control mode as previously determined by the controller, receive a rarefying operation instruction for execution of an operation in the rarefying control mode, from another air-conditioning apparatus installed in the air-conditioning target space, and determine the rarefying control mode as the control mode to be set, in a case where the rarefying operation instruction is received by the controller;

wherein the air-conditioning apparatus further comprises an operation unit configured to perform in advance setting of whether reception of the rarefying operation instruction from the other air-conditioning apparatus is allowed or not, on the controller.

* * * * *